Patented Nov. 28, 1933

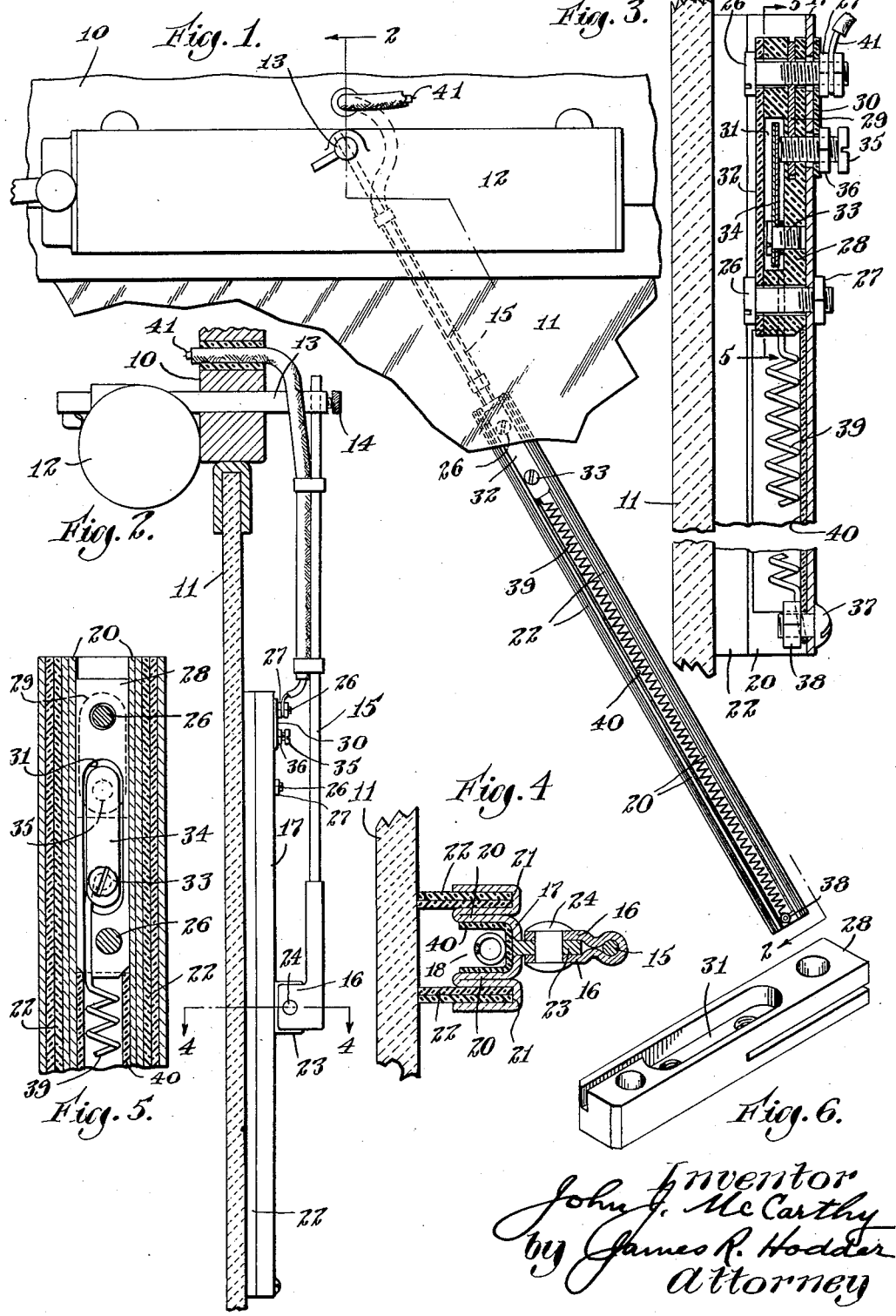

1,937,286

UNITED STATES PATENT OFFICE 1,937,286

WINDSHIELD WIPER

John J. McCarthy, Malden, Mass.

Application April 18, 1930. Serial No. 445,284
Renewed April 18, 1933

1 Claim. (Cl. 15—250)

My present invention relates to cleaning devices, and more particularly to an improved windshield wiper for motor vehicles and the like.

In my copending application, Serial No. 264,464 filed March 24, 1928, I have described and claimed an improved form of windshield wiper in which a thermostat is utilized in combination with a heating element whereby the degree of heat on the windshield is automatically controlled. In further developing this art, I have devised the subject matter of the present invention, particularly with regard to the mechanical construction thereof. The wiping element of my improved wiper consists of a channel like member provided at either side with resilient wiping members and the channel like member provides a space or housing for the heating element. In practising my present improved invention I utilize a single strip or plate of relatively thin material, such as brass or iron and fold it into shape to provide a channel at its central portion and having resilient wiping element holders on each side thereof. Such construction is rigid, though light in weight, and serves its purpose admirably.

The object of my invention therefore, is an improved windshield wiper.

In the accompanying drawing,

Fig. 1 is a view of a portion of a windshield showing my device in position thereon, Fig. 2 is a sectional elevation on the line 2—2 of Fig. 1, Fig. 3 is a longitudinal section of the wiper element of Fig. 2, Fig. 4 is a section on the line 4—4 of Fig. 2, Fig. 5 is a section on the line 5—5 of Fig. 3, and Fig. 6 is a perspective view of the thermostat element block.

Referring to the drawing, 10 designates a portion of a motor vehicle forming the framework for the windshield 11. Mounted on the portion 10 is a motor 12 arranged to oscillate a shaft 13 in the usual manner and which shaft extends through the portion 10. Secured to the shaft 13 by screw 14 is a downwardly depending arm 15, provided at its lower end with spaced ears 16 and to which the wiping element may be attached, as will be hereinafter described.

17 designates a strip or plate of sheet metal, such as brass or iron, folded longitudinally along its axis to form a channel 18. The metal, at each edge of the channel, is then folded back on itself, as indicated at 19. The width of the portion is substantially equal to the width of the side wall 20 of the channel 18. The metal is then folded on itself to form the channel 21 at each side of the channel 18 and in each of these channels 21 is placed a wiping element 22, composed of a plurality of strips of resilient material, such as rubber. The wiping elements are held in the channels 21 by compressing the sides of the chanels 21 on the strips. The wiping elements 22 are arranged parallel to each other, as shown, and the width thereof is greater than the depth of the channels 18 and 21. When the device is in engagement with the windshield 11 therefore, there is formed, by the windshield 11, channel 18 and wiping elements 22, an elongated chamber which is filled with heated air and which serves to heat a relatively large portion of the windshield 11. Secured to or formed integral with the strip or plate 17, centrally of the channel 18 and on the outer face of the plate 17, is a lug or ear 23, perforated as shown and through which, and through perforations in the spaced ears 16, pass a rivet 24 for securing the device to the lower end of the depending arm 15.

Secured at one end of the channel 18, by screws 26 and nuts 27, is a terminal block 28 of insulating material. Embedded in the block 28 is a plate 29 of conducting material, such plate being threaded to receive one of the screws 26. One of the nuts 27 is insulated from the metal 17 by a plate 30 of insulating material. Formed in the block 28 is a recess 31 covered by a plate 32 held in position by the screws 26. Secured to the block 28, within the recess 31, by screw 33, is a thermostatic element 34. Screwing through the metal 17 and through the plate 29 is a screw 35, the inner end of which engages, ordinarily, with the thermostatic element 34. A check nut 36 on the screw 35 holds such screw in adjusted position relative to the thermostatic element 34.

At the end of the channel 18, remote from the block 28, is a screw 37 that passes through the metal 17 and has a nut 38 on its inner end. To the screw 37 is secured one end of a heating element 39, the other end of this element being attached to the screw 33 and therefore, connected, electrically, to the thermostatic element 34. By referring to Fig. 3, it will be noted that the lower end of the block 28 is bevelled and acts as a clamp for the upper end of the U-shaped member 40 of insulating material and which material acts to prevent engagement of the heating element 39 with the metal 17. The lower end of the member 40 is secured in position by the nut 38.

One end of the heating element 39 is grounded through the screw 37, metal 17, and depending arm 15, and the other end thereof is connected by conductor 41 to any suitable source of power, as a storage battery or generator with which the ordinary motor vehicle is equipped.

In operation, if power is turned into the motor 12 to oscillate the arm 15 and therefore the wiper structure, the usual wiping operation takes place. The operator may, if desired, turn power into the conductor 41 and if the thermostatic element 34 is in engagement with the screw 35, the heating element 39 will be heated and the windshield 11 will be heated, causing any snow or ice thereon to be melted and the same wil be easily removed by the wiping element. If the air within the chamber formed by the channel 18, wiping elements 22 and windshield 11 gets too hot, that is, is not dissipated by the cold windshield 11, the thermostatic element 34 will move out of engagement with the screw 35, and cut off the current from the heating element 39. When the temperature of the air within the said chamber lowers sufficiently, the thermostatic element 34 will be brought into engagement with the screw 35 and the screw 35 and the heating element 39 will again be heated. This sequence of operations will be repeated indefinitely and takes place automatically.

While I have necessarily shown and described the preferred embodiment of my invention somewhat in detail, it is to be understood that I may vary the size, shape and arrangement of parts comprising the device within wide limits without departing from the spirit of the invention as claimed.

Having thus described my invention, what I claim as new is:

A windshield wiper comprising a metallic triple U-shaped holder, the central U-shaped portion being closed near one end with an insulating block, an electrical heating element extending from said insulating block in said central U-shaped member to the opposite open end, said insulating block containing an electrical thermostatic control for said heating element and flexible window wiping elements in each of the outer U-shaped members.

JOHN J. McCARTHY.